(12) United States Patent
Hirsh (10) Patent No.: US 12,510,355 B1
(45) Date of Patent: Dec. 30, 2025

(54) ORIENTATION DETERMINATION DEVICE

(71) Applicant: Steven Joseph Hirsh, Deland, FL (US)

(72) Inventor: Steven Joseph Hirsh, Deland, FL (US)

( * ) Notice: Subject to any disclaimer, the term of this patent is extended or adjusted under 35 U.S.C. 154(b) by 0 days.

(21) Appl. No.: 19/063,317

(22) Filed: Feb. 26, 2025

Related U.S. Application Data

(60) Provisional application No. 63/716,713, filed on Nov. 5, 2024.

(51) Int. Cl.
*G01C 9/20* (2006.01)
*G01B 3/56* (2006.01)
*G01B 5/24* (2006.01)

(52) U.S. Cl.
CPC .............. *G01C 9/20* (2013.01); *G01B 3/563* (2013.01); *G01B 3/566* (2013.01); *G01B 5/24* (2013.01)

(58) Field of Classification Search
CPC .......... G01C 9/20; G01B 3/563; G01B 3/566; G01B 5/24
See application file for complete search history.

(56) References Cited

U.S. PATENT DOCUMENTS

| | | | | |
|---|---|---|---|---|
| 25,446 A * | 9/1859 | Scoville | ................... | G01C 9/22 33/377 |
| 1,274,333 A * | 7/1918 | Roland | ................... | G01C 9/22 33/390 |
| 3,826,013 A * | 7/1974 | Baher | ................... | G01C 9/24 D10/69 |
| 4,854,047 A * | 8/1989 | Conanan | ................... | G01C 9/20 33/451 |
| 5,509,657 A * | 4/1996 | Guthry | ............... | A63B 69/3632 33/384 |
| 6,990,742 B1 * | 1/2006 | Schmidt | ................... | G01C 9/20 33/379 |
| 7,937,847 B1 * | 5/2011 | Karapetyan | ............... | G01C 9/20 33/351 |
| 11,828,595 B2 * | 11/2023 | Costello | ................... | G01C 9/34 |
| 2002/0104224 A1 * | 8/2002 | Barker | ................... | G01C 17/20 33/355 R |
| 2006/0254066 A1 * | 11/2006 | Lang | ................... | G01C 9/26 33/371 |
| 2019/0331488 A1 * | 10/2019 | Corrigan | ................ | G01B 11/26 |

FOREIGN PATENT DOCUMENTS

GB 2343950 A * 5/2000 .............. G01C 9/18

* cited by examiner

*Primary Examiner* — Yaritza Guadalupe-Mccall
(74) *Attorney, Agent, or Firm* — Michael D. Eisenberg (57) ABSTRACT

In the embodiments herein, an instrument for level and plumb determinations, includes: a sealed chamber of equal dimensions made from transparent or translucent material marked with center lines and filled with a colored fluid, so when placed on any surface. Relative to the orientation of the surface to the face of the earth, the instrument reveals if a surface is: plumb within an upright position; level within a horizontal position; or at an angle, which can be marked and transferred. Reference lines are placed exactly parallel and centered to the sides and ends.

18 Claims, 4 Drawing Sheets

ORIENTATION DETERMINATION DEVICE

CROSS-REFERENCE TO RELATED APPLICATIONS

This application claims priority to U.S. Provisional Patent Application Ser. No. 63/716,713 filed on Nov. 5, 2024, which is hereby incorporated by reference in its entirety.

FIELD OF INVENTION

The systems and methods herein are directed to time, space, and matter science, for the determination of orientations that are plumb, level, or at angles.

BACKGROUND OF THE INVENTION

Traditional plumb and level determination devices utilize vial bubbles, which require the user of said device to: judge the orientation of the bubble, in relation to the center between two lines. The accuracy of the level is subject to user error and is prone to be off. Additionally, judging the orientation of the bubble, in relation to the center between two lines is time consuming and marred with frustrations for the user of said device. Further, vials can break or be knocked out of line, which gives false readings and there is no way to identify instances of this type of miscalibration. While laser levels have been developed to address the aforementioned issues, lasers are limited in application by virtue of the laser not traveling through walls and there also no way of identifying instances of miscalibration. The said laser is also very expensive, in comparison to vial bubbles.

The systems and methods herein are directed to a single device for determining a plumb, level, and angle, wherein the said device comprise a sealed fluid chamber, which obviates the need for traditional vial bubbles and lasers, while accurately and facilely determining the plumb, level, and the angle via a single device (i.e., the plumb, level, and angle determination devices comprising the fluid chamber of the systems and methods herein).

BRIEF SUMMARY OF THE INVENTION

In a variant, an instrument for level and plumb determinations, comprises: a sealed chamber made from transparent or translucent material marked with sets of center lines and filled with a fluid, such that when placed on any surface, the orientation of the surface to the face of the earth is either plumb, if the instrument is held in an upright direction; or level if the instrument is held in a horizontal direction; and reference lines, which are placed exactly parallel and centered to the sides and ends of the sealed chamber.

In a variant, the fluid is absent of bubbles.

In a variant, the fluid is a colored liquid that is a non-evaporating fluid selected from the group consisting of silica fluid, transmission fluid, or other fluids resistant to evaporation.

In a variant, the sealed chamber is composed of transparent or translucent material comprising polycarbonate, acrylic, Lexan, glass, and plexiglass.

In a variant, a frame is operatively connected to the sealed chamber; and the center lines are perpendicular to one another and bisect one another and are each centered on a side of the instrument.

In a variant, the sealed chamber comprises a spacer strip or injection molded section that have respective sides that are each: (i) proximal to a respective set of the sets of center lines, but not in direct contact with said respective set of the sets of center lines, such that said respective set of the set of center lines is aligned to a center position of said respective side; (ii) perpendicular to two sets of the sets of center lines; and (iii) proximal to the reference lines, but not in direct contact with said the reference lines, wherein each reference line of the references lines bisects two sets of the sets of center lines.

In a variant, the fluid is configured to seek its own level, wherein the fluid is present in the sealed chamber at a range of between 48%-52% of a capacity of the sealed chamber, wherein fluid in the sealed chamber is at a level that: (i) corresponds exactly to a level of a horizontal line of the references lines, while (ii) bisecting a vertical line of the reference lines and (iii) bisecting two sets of the sets of center lines, when the instrument is placed on a surface that is level, wherein said two sets of the sets of center lines are opposite to each other along the horizontal line and bisected by the horizontal line.

In a variant, the sealed chamber is contained within a rectangular framework and wherein the center lines are perpendicular to one another and bisect one another and are each centered on a side of the instrument.

In a variant, the center lines are proximal to each side of the chamber, thereby rendering the center lines as readily viewable to a user of the instrument, when making a level or plumb determination.

In a variant, an instrument for angle determination in degrees, comprises: a sealed chamber made from transparent or translucent material marked with a protractor and filled with a fluid, such that when placed on any surface, the angle determination is achieved; and reference lines that traverse the protractor.

In a variant, the protractor is a plurality of concentric circles.

In a variant, the fluid is a colored liquid that is a non-evaporating fluid selected from the group consisting of silica fluid, transmission fluid, or other fluids resistant to evaporation.

In a variant, the sealed chamber is composed of a transparent or translucent material comprising polycarbonate, acrylic, Lexan, glass, and plexiglass.

In a variant, a frame is operatively connected to the sealed chamber.

In a variant, the fluid is configured to seek its own level, wherein the fluid is present at a range of between 48%-52% of a capacity of the sealed chamber, wherein the fluid in the sealed chamber is at a level that (i) corresponds exactly to a level of a horizontal line of the references lines, while (ii) bisecting a vertical line of the reference lines, and (iii) bisecting the protractor.

In a variant, the sealed chamber is contained within a square framework.

In a variant, the plurality of concentric circles is distal from each side of the chamber.

In a variant, a method determines an orientation via an instrument. The method comprises: placing the instrument on a first surface, thereby modifying or not modifying a fluid level of the instrument; marking the fluid level at two points; wherein the orientation is a level, a plumb, or an angle; and wherein the instrument comprises: (1) sealed chamber having a rectangular perimeter a made from: (a) transparent or translucent material marked and filled with a fluid, and marked with reference lines, and respective sets of center lines, and (b) spacers that ensure the fluid is only affected by gravity, such that when placed on any surface, the orientation of the surface to the face of the earth is either plumb, if the instrument is held in an upright direction, or level, if the instrument is held in a horizontal direction; wherein the reference lines are placed exactly parallel and centered to the sides and ends of the sealed chamber having the rectangular perimeter; wherein each of the respective sets of center lines are placed proximal to a top-most, a bottom-most, a right-most, and a left-most sides, such that each of the respective center lines proximal to the top-most, the bottom-most, the right-most, and the left-most sides make a polygonal perimeter, to aid in ease of viewing of the fluid level, when determining if the orientation is plumb or level; wherein the fluid is present in a range of 48-52% capacity of the sealed chamber having the rectangular perimeter, wherein the fluid level, in the sealed chamber having the rectangular perimeter, (i) corresponds exactly to a level of a horizontal line of the references lines, while (ii) bisecting a vertical line of the reference lines and (iii) bisecting two sets of the respective sets of center lines, when the instrument is placed on a surface that is level, wherein said two sets of the respective sets of center lines are opposite to each other along the horizontal line and bisected by the horizontal line; or (2) a sealed chamber having a square perimeter, wherein the sealed chamber having the square perimeter is made from: (a) transparent or translucent material marked and filled with a fluid, and marked a protractor comprising a plurality of concentric circles, and (b) spacers that ensure the fluid is only affected by gravity, such that when placed on any surface, the angle determination is achieved; and wherein reference lines that traverse the plurality of concentric circles; wherein the fluid is present in a range of 48-52% capacity of the sealed chamber having the rectangular perimeter, wherein the fluid level in the sealed chamber having the rectangular perimeter, (i) corresponds exactly to a level of a horizontal line of the references lines, while (ii) bisecting a vertical line of the reference lines, when the instrument is placed on a surface that is level.

In a variant, the method further comprises: placing the instrument of a second surface, wherein the second surface is lying flat; flipping level lining up marks of the instrument with a top edge of the second surface; measuring a length to a top of the second surface; aligning level marks; and squaring up or squaring down for a ridge cut.

In a variant, the rectangular perimeter further comprises a rectangular framework appended to the rectangular perimeter; and the square perimeter further comprises a square framework appended to the square perimeter.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

In the systems and methods herein, devices are disclosed herein which can determine orientations, including: (Variant 1) plumb and level determinations; and (Variant 2) angle determinations. In both Variants 1 and 2, a frame surrounds a sealed chamber, wherein the sealed chamber comprises: (i) a transparent or translucent wall (or frosted glass) with (ii) markings and (iii) reference lines configured for: (a) determining if the device is level or plumb, in relation to the face of the earth (Plumb and Level Determination Device), or (b) determining an angle (Angle Degree Finder Device); (ii) a high temperature evaporating fluid that pours into the sealed chamber to 48%-52% capacity (48%, 49%, 50%, 51%, or 52% capacity, where 50% is the preferred capacity); and (iii) spacer strip(s) or injection molded section(s). The frame is in direct contact with a surface that Variant 1 and Variant 2 is placed on. The sealed chamber, which contains the fluid for determining plumb, level, or angles, is: (i) not disturbed by the frame and (ii) constantly maintains alignment, while also (iii) obviating vial bubbles, in a facile determination system that can readily be viewed by a user of the device, to identify surfaces that are plumb or level, or angles. The sealed chamber of Variants 1 and 2 is affected by gravity only, which can be attributed to the spacer of the sealed chamber. The spacer can be composed of, for example, injection modeled material or metal that aids the fluid, such that a perfect level is always maintained and can never be knocked out of alignment in the sealed chamber. In contrast to devices in the art, such as a tube of water and plumb bob, which are cumbersome and time-consuming to use, Variants 1 and Variants 2 can be placed on a single surface or two surfaces to make rapid and accurate plumb and level determinations, which are readily viewable (discernible) by the user of the instrument herein. In carpentry, exact and precise plumb and level determinations, by Variant 1, and exact and precise angle determinations, by Variant 2 can be achieved in a rapid and simple manner. More particularly, the fluid level is always aligned irrespective of: (1) the surface Variant 1 or Variant 2 are placed on; and (2) the humidity or temperature that Variant 1 or Variant 2 are exposed to. This is in contrast to other plumb and level devices that can be altered by humidity or other environmental factors, which in turn does not always lead to the same plumb or level determinations. Variant 1 and Variant 2, which have an aligned fluid level, are agnostic (i.e., impervious) to the external conditions the device is exposed to, and therefore the plumb and level determinations are accurate and consistent.

In the systems and methods herein, Variant 1 is the plumb and level determination device comprising the fluid in the chamber that is affected by gravity, such that the fluid always settles to level or plumb. Level is read by comparison to a center line with a clear reference to the length of the level. Fluid following the line all the way across the level is deemed to be level. Additionally, plumb determinations can be made, wherein the chamber has a rectangular perimeter surrounded or enclosed by a rectangular frame in Variant 1. Alternatively to Variant 1, Variant 2 is the angle degree finder device comprising the fluid in the chamber and the sealed chamber are affected by gravity, such that the fluid always settles to level (horizontal placement) or plumb (vertical placement), wherein the chamber has a square perimeter surrounded by a square frame.

Figure 2:
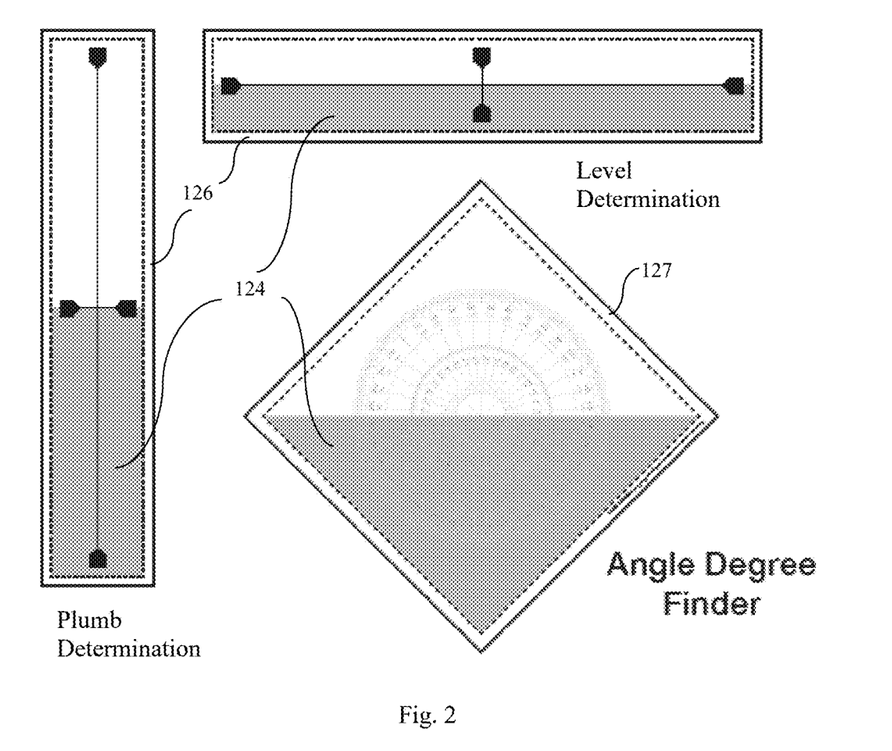
FIG. 2 is a depiction of the orientations determined by the devices herein, in accordance with the embodiments herein.
Figure 3:
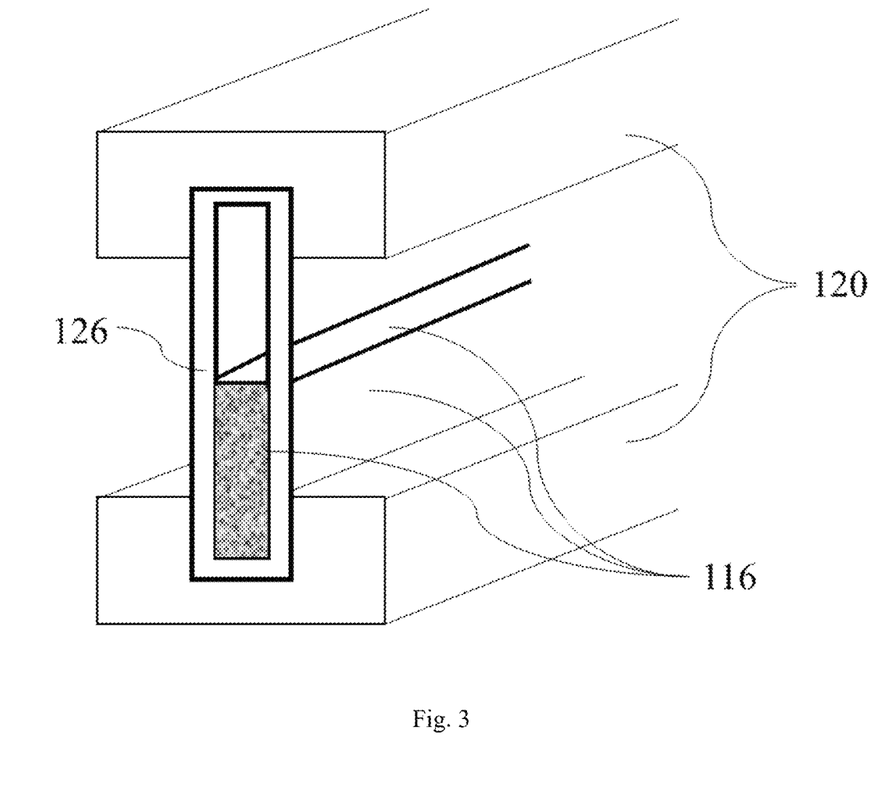
FIG. 3 is a depiction of the end view section of a plumb and the level determination device, in accordance with the embodiments herein.

Alternatively, as depicted in FIG. 2, Variant 2 is an angle degree device comprising the fluid in the chamber and the sealed chamber are affected by gravity, such that the fluid always settles to level (horizontal placement) or plumb (vertical placement), wherein the chamber has a diamond perimeter. A frame that is also diamond shaped can surround the diamond perimeter, or a horizontal mount can be fitted onto the bottom point of the diamond perimeter (not depicted in FIG. 2). The horizontal mount with the appended angle degree device comprising the fluid in the chamber and the sealed chamber affected by gravity can be placed on a surface, such that the viewer can readily view the positions of fluid when making angle measurements/determinations.

In the systems and methods herein, the fluid chamber level, of the plumb and level determination device, is a facile way to measure level, plumb or angles, by virtue of being in reference to gravity and to the face of the earth. As indicated above, vial bubbles and cumbersome setups are obviated by Variants 1 and 2.

Figure 1:
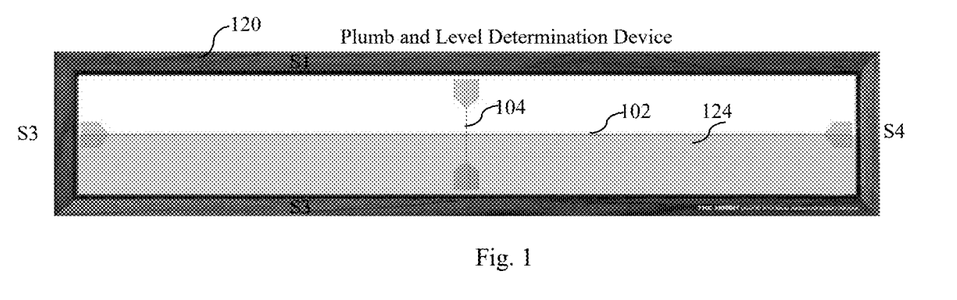
FIG. 1 is a depiction of a plumb and level determination device with a frame around the chamber, in accordance with the embodiments herein.
Figure 6:
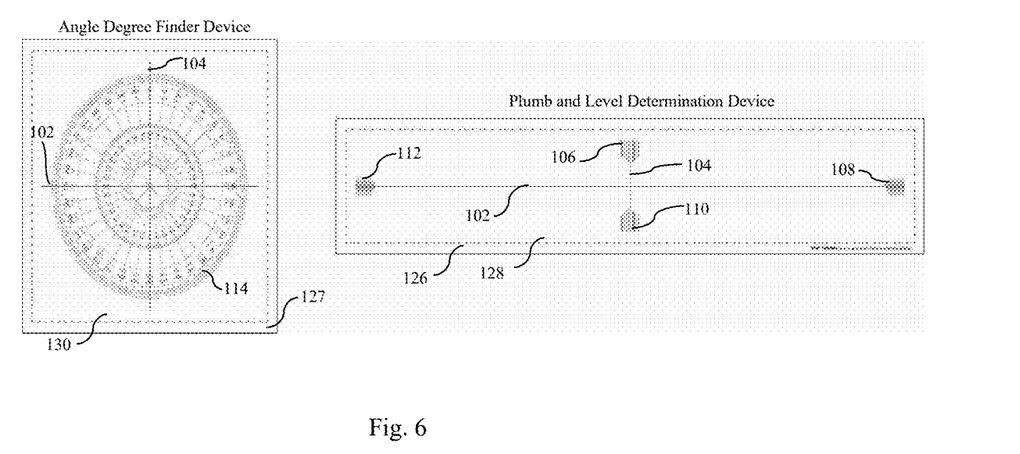
FIG. 6 and FIG. 7 are depictions of an angle degree finder device, and a plumb and level determination device, filled with fluid, in accordance with the embodiments herein.
Figure 7:
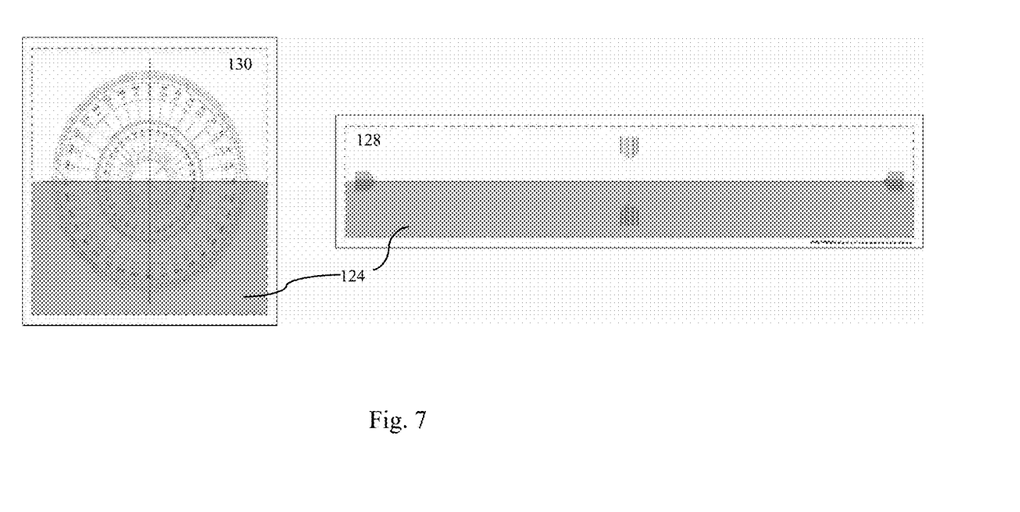

In the systems and methods herein, Variant 1 is the plumb and level determination device, which comprises: sealed chamber 116; fluid 124 filled to 48%-52% capacity (48%, 49%, 50%, 51%, or 52% capacity, where 50% is the preferred capacity) of sealed chamber 116; a spacer strip or injection molded section; and markings on transparent or translucent wall 128 of sealed chamber 116, wherein sealed chamber 116 is rectangular and enclosed by frame 120. Frame 120 can be composed of wood, metal, polycarbonate, or any other suitable material. The surfaces of frame 120 (S1, S2, S3, and S4) indent inwards toward transparent or translucent wall 128, while having perfectly flat surfaces on S1, S2, S3, and S4, wherein S1 and S3 can be placed on another surface for level determination; and S2 and S4 can be placed on another surface for plumb determination. (See FIG. 1, FIG. 2, FIG. 3, FIG. 6, and FIG. 7.) The markings on transparent or translucent wall 128 are marked or etched with: (i) reference lines that span across sealed chamber 116 as horizontal reference line 102 and vertical reference line 104; and (ii) four set of center lines, wherein a first set of center lines 106 is in an upper, center region of sealed chamber 116; a second set of center lines 108 is in a right, center region of sealed chamber 116; a third set of center lines 110 is in a bottom, center region of sealed chamber 116; and a fourth set of center lines 112 is in a left, center region of sealed chamber 116. (See right-most depiction in FIG. 6.) The first set of center lines 106 in the upper, center region of sealed chamber 116 is proximal to a spacer strip or injection molded section 126, but does not directly contact a spacer strip or injection molded section. The second set of center lines 108 in a right, center region of sealed chamber 116 is proximal to a spacer strip or injection molded section, but does not directly contact a spacer strip or injection molded section. The third set of center lines 110 in the bottom, center region of sealed chamber 116 is proximal to a spacer strip or injection molded section, but does not directly contact a spacer strip or injection molded section. The fourth set of center lines 112 in the left, center region of sealed chamber 116 is proximal to a spacer strip or injection molded section, but does not directly contact a spacer strip or injection molded section. The first set of center lines 106, the second set of center lines 108, the third set of center lines 110, and the fourth set of center lines 112 each have equidistant lines that can be enveloped within a pentagonal perimeter, as depicted in FIG. 1, FIG. 6, and FIG. 7. For level determination, horizontal reference line 102 spans from the second set of center lines 108 and the fourth set of center lines 112, while also bisecting the pentagonal perimeters of the second set of center lines 108 and the fourth set of center lines 112. For plumb determination, vertical reference line 104 spans from the first set of center lines 106 and the third set of center lines 110, while also bisecting the pentagonal perimeters of the first set of center lines 106 and the third set of center lines 110.

The reference lines (102 and 104) and the center lines (106, 108, 110, and 112), in conjunction with the fluid level, allow the user to accurately, precisely, and readily view the position/orientation of the fluid, in relation to the reference lines (102 and 104) and center lines (106, 108, 110, and 112). The equidistance of center lines 106, 108, 110, and 112 and proximal yet non-contact orientations of center lines 106, 108, 110, and 112 to the frame are readily apparent to a user of Variant 1. Therefore, the user of Variant 1 can quickly determine if a surface is level or plumb to greater degrees of accuracy and precision. The fluid is colored to aid, in combination with reference and center lines aid in the readability of the device, while making the device easier to become marked with the level or the plumb.

In the systems and methods herein, Variant 2 is the angle degree finder device, which comprises: sealed chamber 116; fluid 124 filled to 48%-52% capacity (48%, 49%, 50%, 51%, or 52% capacity, where 50% is the preferred capacity) of sealed chamber 116; a spacer strip or injection molded section 127; and markings on transparent or translucent wall 130 of sealed chamber 116, wherein sealed chamber 116 is square shaped and enclosed by a frame composed of wood, metal, polycarbonate, or any other suitable material. The surfaces of said frame can indent inwards toward transparent or translucent wall 130, while having perfectly flat surfaces that can be placed on another surface for level determination; and S2 and S4 can be placed on another surface for angle determination. (See FIG. 2, FIG. 6, and FIG. 7.) The markings on transparent or translucent wall 130 are marked or etched with: (i) reference lines that span across sealed chamber 116 as horizontal reference line 102 and vertical reference line 104; and (ii) protractor 114 of two or more concentric circles with sub-markings corresponding to enumerated angle numbers. (See left-most depiction in FIG. 6.) Protractor 114 is distal from the spacer strip or injection molded section, such that protractor 114 is in the center of transparent or translucent wall 130. The concentric circles with sub-markings corresponding to enumerated angle numbers are separated from each other via. The outermost concentric circle with sub-markings corresponding to enumerated angle numbers is sandwiched in between: (L1) a three layer combination of markings along a respective circular perimeter (relatively larger number of markings that are smaller than a single layer of markings); and (L2) a single layer of markings along a circular perimeter (relatively smaller number of markings that are larger than the three layer combination). The innermost concentric circle with sub-markings corresponding to enumerated angle numbers is sandwiched in between: (L2) the single layer of markings along a circular perimeter; and (L3) a two layer combination of markings along a respective circular perimeter. Horizontal reference line 102 spans from the 270 degree mark to the 90 degree mark to bisect protractor 114 into a top half and a bottom half. Vertical reference line 104 spans from the 0 degree mark to the 180 degree mark to bisect protractor 114 into a left half and a bottom half.

In the systems and methods herein, specific angles can be determined, by virtue of the angle finder operatively connected to the fluid chamber. The angle finder of the plumb and level determination device resembles or is identical to a protractor, in for example a square version. The square version can be used to detect angles, as well as level and plumb, with a protractor scale. However, the primary purpose of the square version is angle detection, by virtue of short sided dimensions, which makes for a smaller reference. If two points reside along the 90 degree line, then the two points are level. If two points reside along the 0 degree line, then the two points are plumb. The protractor has four quadrants, wherein each quadrant spans 0 to 90 degrees.

In the systems and methods herein, the fluid chamber of the plumb and level determination device comprises: thin transparent or translucent walls, a spacer strip or injection molded section, and a high temperature evaporating fluid without any bubbles within a sealed chamber, wherein the fluid is a colored liquid. By virtue of using a high temperature evaporating fluid and the sealed chamber, the overall fluid is not changed and bubbles do not form in the fluid. The high temperature evaporating fluid can be silica fluid, transmission fluid, or other fluids resistant to evaporation from 0 deg Celsius-150 deg Celsius. For example, the chamber is of equal dimensions made from transparent or translucent material, or any other clear material (e.g., polycarbonate, acrylic, Lexan, glass, and plexiglass) marked with center lines and filled with colored fluid to 48%-52% capacity (48%, 49%, 50%, 51%, or 52% capacity, where 50% is the preferred capacity) so when placed on any surface, the orientation of the surface is revealed to the face of the earth such that the determination is either: (i) plumb, if Variant 1 or Variant 2 is held upright; or (ii) level, if Variant 1 or Variant 2 is held horizontal. Irrespective of the material used to construct Variant 1 or Variant 2, the fluid level is always aligned in the sealed chamber and therefore the level, plumb, and angle determinations are consistent due to the sealed chamber therein.

In the systems and methods herein, the fluid can align with the reference lines, which are placed exactly parallel and centered to the sides and ends. (See FIG. 1, FIG. 2, and FIG. 7). The plumb lines (plumbs) are longitudinal (vertical) and the level lines (levels) are latitudinal (horizontal). The chamber is filled with colored fluid that is marked with reference lines parallel and centered from the edges to a reference level.

In the systems and methods herein, Variant 1 is an instrument for level and plumb determinations comprising: a sealed chamber of equal dimensions made from transparent or translucent material marked with center lines and filled with colored fluid to 48%-52% capacity (48%, 49%, 50%, 51%, or 52% capacity, where 50% is the preferred capacity) so when placed on any surface, the orientation of the surface to the face of the earth either plumb, if Variant 1 is the held in an upright direction; or level if Variant 1 is held in a horizontal direction; and reference lines, which are placed exactly parallel and centered to the sides and ends.

In the systems and methods herein, Variant 2 is an instrument for an angle finder comprising: a sealed chamber of equal dimensions made from transparent or translucent material marked with center lines and filled with colored fluid to 48%-52% capacity (48%, 49%, 50%, 51%, or 52% capacity, where 50% is the preferred capacity); and a plurality of concentric circles corresponding to a protractor setup.

Figure 4:
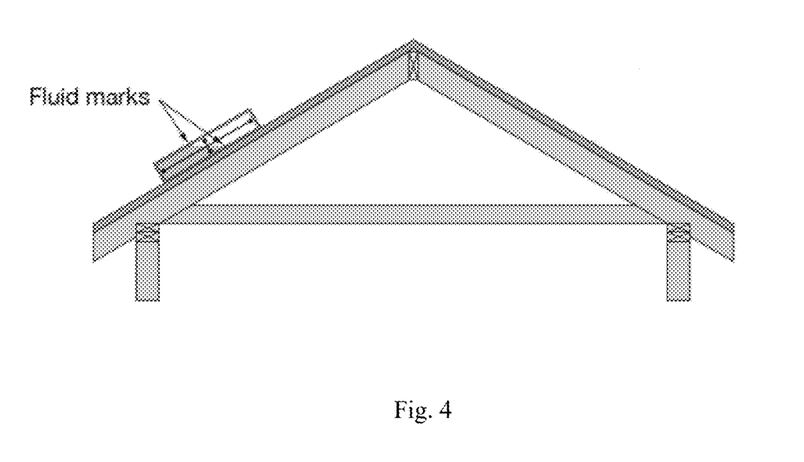
FIG. 4 is a depiction of placing a plumb and the level determination device on a first surface, in accordance with the embodiments herein.
Figure 5:
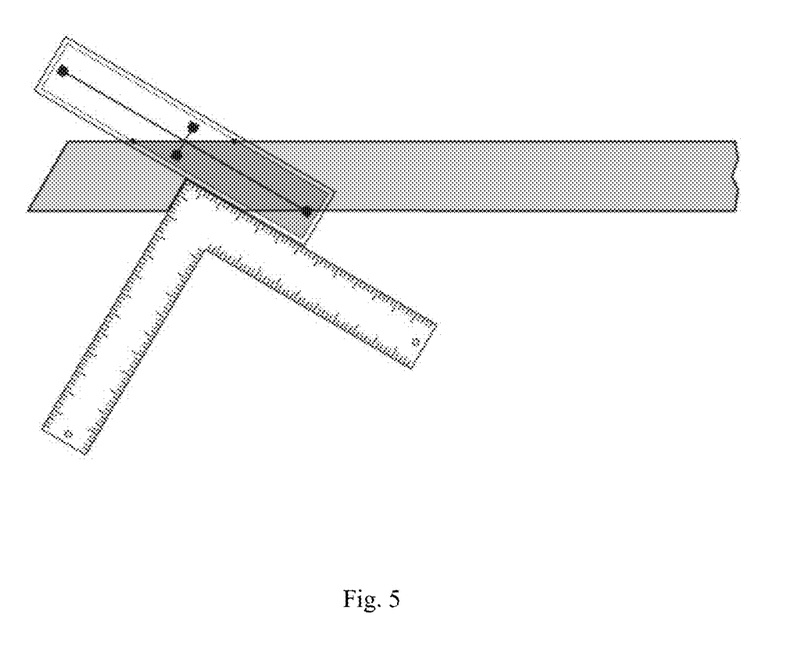
FIG. 5 is a depiction of placing a plumb and the level determination device on a second surface, in accordance with the embodiments herein.

In the systems and methods herein, Variant 1 can be used in a carpentry setting in two processes, where Step 1 in FIG. 4 followed by Step 2 in FIG. 5. As depicted in FIG. 4, the level and plumb determination device is placed on a roof perpendicular to a ridge (first surface) and the fluid in the level and plumb determination device is marked, wherein the fluid lines are shifted in relation to the fluid lines in FIG. 1. As depicted in FIG. 5, the level and plumb determination device is placed on a rafter stock lying flat (second surface), where marks from Step 1 are flipped with the top edge of the rafter; squared down for end of the rafter and Birds Mouth cuts; assessed for measuring length to the top of the rafter; aligned with marks; and squared up for the ridge cut.

In the systems and method herein, Variant 1 and Variant 2 can be used for pipe pitching and other instances which require a slope or a pitch that must be uniform and exact, by virtue of not being limited to the range of a vial bubble.

In the systems and methods herein, Variant 1 and Variant 2 can be filled with the fluid in a sealed chamber having a rectangular perimeter and a sealed chamber having a square perimeter, respectively. Variant 1 and Variant 2, by virtue of the spacers that construct the sealed chamber having the rectangular perimeter and sealed chamber having the square perimeter, are filled with fluid that is only impacted by gravity, thereby ensuring the fluid that is level or plumb within the sealed chamber.

In the systems and methods herein, the sealed chamber in Variant 1 can be filled to, for example, 50% capacity of the sealed chamber. In Variant 1, the fluid in the sealed chamber is at a level that: (i) corresponds exactly to a level of a horizontal line (line 102) of the references lines, while (ii) bisecting a vertical line (line 104) of the reference lines, and (iii) bisecting two sets (108, 112) of the sets of center lines (106, 108, 110, 112), when Variant 1 is placed on a surface that is level, wherein: the second set of center lines 108 and the fourth set of center lines 112 are opposite to each other along the horizontal line (line 102) and bisected by the horizontal line (line 102); the third set of center lines 110 is engulfed by the fluid; and the first set of center lines 106 is distal from the fluid. The third set of center lines 110 and the first set of center lines 106 are opposite to each other along the vertical line (line 104) and bisected by vertical line (line 104). Bisection herein refers to splitting lines, polygons, or other regular shapes into two exact or equal components.

In the systems and methods herein, the polygonal perimeter along each set of the sets of center lines (106, 108, 110, 112) and bisection of each set of the sets of centerlines (106, 108, 110, and 112) by lines 102 or 104, in combination with the positioning of reference lines (102 and 104) and the proximal position of each set of the sets of center lines (106, 108, 110, 112), as engraved into translucent wall 128, aligned in a centered position of a respective side of the spacer edges (126) of the sealed chamber, in a perpendicular fashion, without contacting respective sides of spacer edges (126), allow for direct, readily discernible, accurate, and precise measurements by the user of Variant 1.

In the systems and methods herein, the sealed chamber in Variant 2 can be filled to, for example, 50% capacity of the sealed chamber. In Variant 2, the fluid in the sealed chamber is at a level that: corresponds exactly to a level of a horizontal line (102) of the references lines, while (ii) bisecting a vertical line (104) of the reference lines, and (iii) bisecting the protractor (114), when Variant 2 is placed on a surface that is level, wherein each concentric circle of the plurality of circles in protractor 114 is bisected by line 102 or line 104. Bisection herein refers to splitting lines, polygons, or other regular shapes into two exact or equal components.

In the systems and methods herein, the concentricity of the circles of protractor 114 and bisection of each concentric circle of protractor 114 by lines 102 and lines 104, in combination with the positioning of reference lines (102 and 104) and the distal position of protractor 114, as engraved into and centered into translucent wall 130, without contacting respective sides of spacer 127, allow for direct, readily discernible, accurate, and precise measurements, by the user of Variant 2.

In the systems and methods herein, measurements that are direct, readily discernible; accurate; and precise are defined herein as plumb, level, or angle determinations that involves the user of Variant 1 or Variant 2 being able to: (1) facilely look at fluid levels in the sealed chamber when placed on a surface; (2) identify the fluid levels, in relation to reference lines, center lines, and/or markings in the protractor, that: (3) do not deviate across trials (which corresponds to being precise) and (4) do not lead to misleading assessments (which corresponds to being accurate). In Variant 1, the center lines which are equidistant from each other in a set of center lines and perpendicular, in relation to a proximal side of the sealed chamber; the vertical reference line; the horizontal reference line; and the bisection of each set of center lines are regions of symmetric demarcations on a translucent wall in a sealed chamber that aid in viewability of fluid levels, in relation to said center lines, vertical reference line, and horizontal reference line. In Variant 2, the concentricity of the circles in the protractor; the vertical reference line; the horizontal reference line; and the bisection of each set of circles are regions of symmetric demarcations on a translucent wall in a sealed chamber that aid in viewability of fluid levels, in relation to said circles, vertical reference line, and horizontal reference line.

What is claimed is:

1. An instrument for level and plumb determinations, comprising:
a sealed chamber made from transparent or translucent material marked with sets of center lines and filled with a fluid, such that when placed on any surface, the orientation of the surface to the face of the earth is either plumb, if the instrument is held in an upright direction; or level if the instrument held in a horizontal direction; and
reference lines, which are placed exactly parallel and centered to the sides and ends of the sealed chamber;
wherein the fluid is configured to seek its own level, wherein the fluid is present in the sealed chamber at a range of between 48%-52% of a capacity of the sealed chamber, wherein the fluid in the sealed chamber is at a level that: (i) corresponds exactly to a level of a horizontal line of the references lines, while (ii) bisecting a vertical line of the reference lines, and (iii) bisecting two sets of the sets of center lines, when the instrument is placed on a surface that is level, wherein said two sets of the sets of center lines are opposite to each other along the horizontal line and bisected by the horizontal line.

2. The instrument for level and plumb determinations of claim 1, wherein the fluid is absent of bubbles.

3. The instrument for level and plumb determinations of claim 2, wherein the fluid is a colored liquid that is a non-evaporating fluid selected from the group consisting of silica fluid, transmission fluid, or other fluids resistant to evaporation.

4. The instrument for level and plumb determinations of claim 1, wherein the sealed chamber is composed of transparent or translucent material comprising polycarbonate, acrylic, Lexan, glass, and plexiglass.

5. The instrument for level and plumb determinations of claim 1, further comprising a frame operatively connected to the sealed chamber.

6. The instrument for level and plumb determinations of claim 1, wherein the sealed chamber comprises a spacer strip or injection molded section that have respective sides that are each: (i) proximal to a respective set of the sets of center lines, but not in direct contact with said respective set of the sets of center lines, such that said respective set of the set of center lines is aligned to a center position of said respective side; (ii) perpendicular to two sets of the sets of center lines; and (iii) proximal to the reference lines, but not in direct contact with said the reference lines, wherein each reference line of the references lines bisects two sets of the sets of center lines.

7. The instrument for level and plumb determinations of claim 1, wherein: the sealed chamber is contained within a rectangular framework; and wherein the center lines are perpendicular to one another and bisect one another and are each centered on a side of the instrument.

8. The instrument for level and plumb determinations of claim 1, wherein the center lines are proximal to each side of the chamber, thereby rendering the center lines as readily viewable to a user of the instrument, when making a level or plumb determination.

9. An instrument for angle determination in degrees, comprising:
a sealed chamber made from transparent or translucent material marked with a protractor and filled with a fluid, such that when placed on any surface, the angle determination is achieved; and
reference lines that traverse the protractor;
wherein the fluid is configured to seek its own level, wherein the fluid in the sealed chamber is present at 48%-52% capacity of the sealed chamber, wherein the fluid in the sealed chamber is at a level that (i) corresponds exactly to a level of a horizontal line of the references lines, while (ii) bisecting a vertical line of the reference lines, and (iii) bisecting the protractor.

10. The instrument for angle determination in degrees of claim 9, wherein the protractor is a plurality of concentric circles.

11. The instrument for angle determination in degrees of claim 9, wherein the fluid is a colored liquid that is a non-evaporating fluid selected from the group consisting of silica fluid, transmission fluid, or other fluids resistant to evaporation.

12. The instrument for angle determination in degrees of claim 9, wherein the sealed chamber is composed of a transparent or translucent material comprising polycarbonate, acrylic, Lexan, glass, and plexiglass.

13. The instrument for angle determination in degrees of claim 9, further comprising a frame operatively connected to the sealed chamber.

14. The instrument for angle determination in degrees of claim 9, wherein the sealed chamber is contained within a square framework.

15. The instrument for angle determination in degrees of claim 9, wherein the plurality of concentric circles is distal from each side of the chamber.

16. A method for determining an orientation via an instrument, wherein the method comprises:
   placing the instrument on a first surface, thereby modifying or not modifying a fluid level of the instrument;
   marking the fluid level at two points;
   wherein the orientation is a level, a plumb, or an angle; and
wherein the instrument comprises:
   (1) sealed chamber having a rectangular perimeter a made from: (a) transparent or translucent material marked and filled with a fluid, and marked with reference lines, and respective sets of center lines, and (b) spacers that ensure the fluid is only affected by gravity, such that when placed on any surface, the orientation of the surface to the face of the earth is either plumb, if the instrument is held in an upright direction, or level, if the instrument is held in a horizontal direction;
   wherein the reference lines are placed exactly parallel and centered to the sides and ends of the sealed chamber having the rectangular perimeter;
   wherein each set of the respective sets of center lines is placed proximal to a top-most side, a bottom-most side, a right-most side, or a left-most side, such that each set of the respective sets of center lines proximal to the top-most, the bottom-most, the right-most, and the left-most sides make a polygonal perimeter, to aid in ease of viewing of the fluid level, when determining if the orientation is plumb or level;
   wherein the fluid is present in a range of 48-52% capacity of the sealed chamber having the rectangular perimeter, wherein the fluid level in the sealed chamber having the rectangular perimeter, (i) corresponds exactly to a level of a horizontal line of the references lines, while (ii) bisecting a vertical line of the reference lines and (iii) bisecting two sets of the respective sets of center lines, when the instrument is placed on a surface that is level, wherein said two sets of the sets of center lines are opposite to each other along the horizontal line and bisected by the horizontal line; or
   (2) a sealed chamber having a square perimeter, wherein the sealed chamber having the square perimeter is made from: (a) transparent or translucent material marked and filled with a fluid, and marked a protractor comprising a plurality of concentric circles, and (b) spacers that ensure the fluid is only affected by gravity, such that when placed on any surface, the angle determination is achieved; and
   wherein reference lines that traverse the plurality of concentric circles;
   wherein the fluid is present in a range of 48-52% capacity of the sealed chamber having the rectangular perimeter, such that the fluid level in the sealed chamber having the rectangular perimeter, (i) corresponds exactly to a level of a horizontal line of the references lines, while (ii) bisecting a vertical line of the reference lines, when the instrument is placed on a surface that is level.

17. The method of claim 16, further comprising:
placing the instrument of a second surface, wherein the second surface is lying flat;
flipping level lining up marks of the instrument with a top edge of the second surface;
measuring a length to a top of the second surface;
aligning level marks; and
squaring up or squaring down for a ridge cut.

18. The method of claim 16, wherein:
the rectangular perimeter further comprises a rectangular framework appended to the rectangular perimeter; and
the square perimeter further comprises a square framework appended to the square perimeter.

* * * * *